United States Patent [19]

Russell

[11] Patent Number: 5,084,869

[45] Date of Patent: Jan. 28, 1992

[54] BASE STATION FOR MOBILE RADIO TELECOMMUNICATIONS SYSTEMS

[75] Inventor: Jesse E. Russell, Piscataway, N.J.

[73] Assignee: AT&T Bell Laboratories, Murray Hill, N.J.

[21] Appl. No.: 473,082

[22] Filed: Jan. 31, 1990

[51] Int. Cl.$^5$ .............................................. H04J 3/02
[52] U.S. Cl. .................................. 370/85.7; 370/85.9
[58] Field of Search ...................... 370/50, 85.7, 95.1, 370/95.3, 85.9, 85.11; 455/33; 379/59

[56] References Cited

U.S. PATENT DOCUMENTS 4,888,765 12/1989 Dyke .................................... 370/95.1
4,888,769 12/1989 Deal ........................................ 370/50

Primary Examiner—Douglas W. Olms
Assistant Examiner—Melvin Marcelo
Attorney, Agent, or Firm—Maurice de Picciotto

[57] ABSTRACT

A base station (10) for mobile radio telecommunications systems comprises a radio frame set (11), an amplifier frame (12) and an antenna interface frame (13) connected to transmit and receive antennas (22 and 23). The radio frame set (11) comprises a radio channel frame (14) including a radio control complex (31), a plurality of radio channel units (54) and a plurality of digital interface circuits (57) for interconnecting the base station to a remote mobile telephone switching office. A time division multiplexed bus (53), connected to the radio control complex (31), the radio channel units (54) and the interface circuits (57), is used for selectively connecting, under the control of the radio control complex (31), any radio channel unit (54) to any digital interface circuit (57). Such a radio channel arrangement is capable of handling analog, as well as, digital radio channel units while exhibiting greater capacity, easier maintenance and upgrade, and substantially increased flexibility (FIG. 3).

7 Claims, 3 Drawing Sheets

BASE STATION FOR MOBILE RADIO TELECOMMUNICATIONS SYSTEMS

TECHNICAL FIELD

The present invention relates to mobile radio telecommunications systems and, more particularly, to an improved base station for use in cellular telecommunications systems.

BACKGROUND OF THE INVENTION

In high capacity cellular mobile radiotelephone systems, a plurality of base stations, also referred to as cell sites, are arranged so that each cell site covers a respective geographical area called a cell. Typically, each such cell site contains a radio transmitter-receiver and is directly wired to a mobile telephone switching office (MTSO) which in turn is part of a regional or nationwide network of telephone switching offices. One example of such cell site is the AT&T Series I cell sites (Model 1 and Model 2 architecture) used in the family of AUTOPLEX® cellular telecommunications systems which are commercially available from the American Telephone and Telegraph Company of New York, N.Y. Such known cell sites have operated satisfactorily for their intended purposes for which they were originally designed. However, because of increased demands for more radio channels occupying smaller physical facilities in combination with requirements of integrating digital data links and facilities in the radio frames at the site, there exists a need for a digital cell site capable of handling analog as well as digital radio channel units while exhibiting greater capacity, easier maintenance and upgrade, and more flexibility than now exist with commercially available equipments.

SUMMARY OF THE INVENTION

The foregoing need is met in an embodiment of the invention wherein a base station for mobile radio telecommunications systems comprises a radio channel frame including a radio control complex and a plurality of radio channel units located within the frame; communication links for bidirectionally coupling the base station to a remote mobile telecommunications switching office; a plurality of digital interface circuits, located within the radio channel frame, for interconnecting the radio channel frame to the communication links; and multiplexing bus arrangement connected between the radio control complex and the radio channel units for selectively connecting, under the control of the radio control complex, any one of the plurality of radio channel units to any one of the plurality of digital interface circuits.

In accordance with another embodiment, a radio channel frame for cellular telecommunications systems comprises a control processing unit; a system bus coupled to the control processing unit; a memory circuit, a network control interface circuit and a communications processor interface circuit each connected to the system bus so that the control processing unit is capable of accessing each of the circuits; a plurality of radio channel units, each capable of performing setup, locate and voice channel functions; a plurality of digital interface circuits for interconnecting the radio channel frame to incoming and outgoing voice and data frame links; and multiplexing bus arrangement adapted for selectively coupling under the control of the control processing unit any one of the plurality of radio channel units to any one of the plurality of digital interface circuits.

In accordance with a preferred embodiment, a radio channel frame for cellular telecommunications systems comprises first and second control processing units adapted to be interconnected by an update bus; first and second system buses respectively coupled to the first and second control processing units; first and second memory circuits respectively connected to the first and the second system bus so that each control processing unit is capable of accessing the first and second memory circuits; first and second network control interface circuits respectively connected to the first and the second system bus; first and second communications processor interface circuits respectively connected to the first and the second system bus; a plurality of radio channel units each capable of performing setup, locate or voice channel functions; a plurality of digital interface circuits for interconnecting the radio channel frame to incoming and outgoing voice and data frame links; and time division multiplexed bus arrangement adapted for selectively coupling, under the control of either one of the control processing units, any one of the plurality of radio channel units to any one of the plurality of digital interface circuits.

BRIEF DESCRIPTION OF THE DRAWING

Further features and advantages of the present invention will become apparent from the following detailed description taken together with the drawings in which.

DETAILED DESCRIPTION

Figure 1:
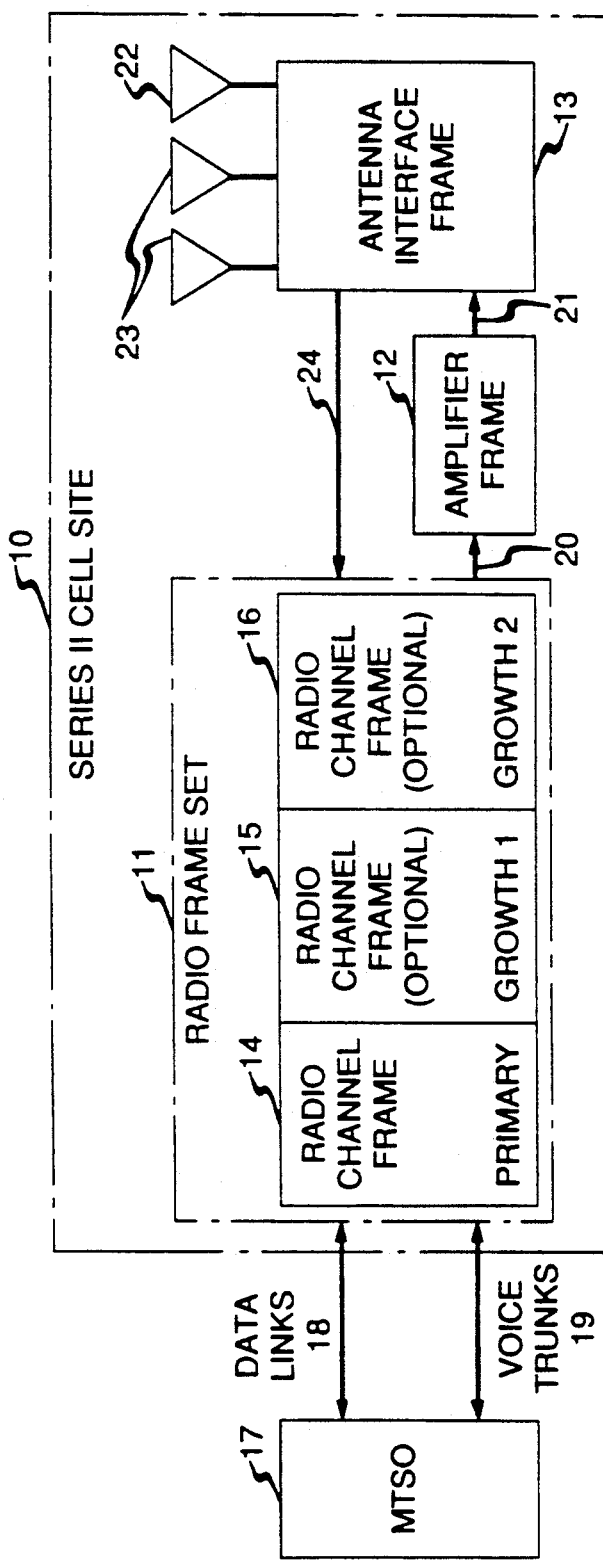
FIG. 1 is a block diagram configuration of a cell site connected to an MTSO.

Shown in FIG. 1 is a schematic representation of cell site 10 which illustratively includes three different frames, namely a radio frame set 11, an amplifier frame 12 and an antenna interface frame 13. Included within the radio frame set 11 is at least one radio channel frame 14, called the primary frame. Additional radio channel growth frames, such as frames 15 and 16, may be selectively added to the primary radio channel frame 14 depending upon the capacity desired at the cell site 10. Similarly, an additional amplifier frame and a second antenna interface frame may be added to the cell site 10 based upon the overall requirements and capacity of the cell site 10. Also shown in FIG. 1 is a mobile telephone switching office (MTSO) 17 which is adapted to link a cellular or mobile subscriber (not shown) into the standard telephone network as well to other cellular subscribers. All data and voice communications between the MTSO 17 and the cell site 10 are achieved, respectively, over data links 18 and voice trunks 19 connected between the radio frame, such as primary radio channel frame 14, and the MTSO 17. Although links 18 and trunks 19 are each illustratively shown as a single connecting line, each such link or trunk consists of a plurality of physical connections between the MTSO 17 and the primary radio channel frame 14, for example.

Radio signals to be transmitted from the MTSO 17 via the cell site 10 to a cellular subscriber, i.e., radio transmissions in the forward direction, are derived from the radio frame set 11 and coupled, via lead 20, to the amplifier frame 12 for appropriate amplification prior to transmission. The amplified signals to be transmitted are then connected, via lead 21, to the antenna interface frame 13 for radio transmission via a transmitting antenna 22. Radio transmission in the reverse direction, i.e., signals received at the cell site 10 from cellular subscribers, are received at the receiving antennas 23, and coupled to the radio frame set 11 via the antenna interface frame 13 and lead 24.

Figure 2:
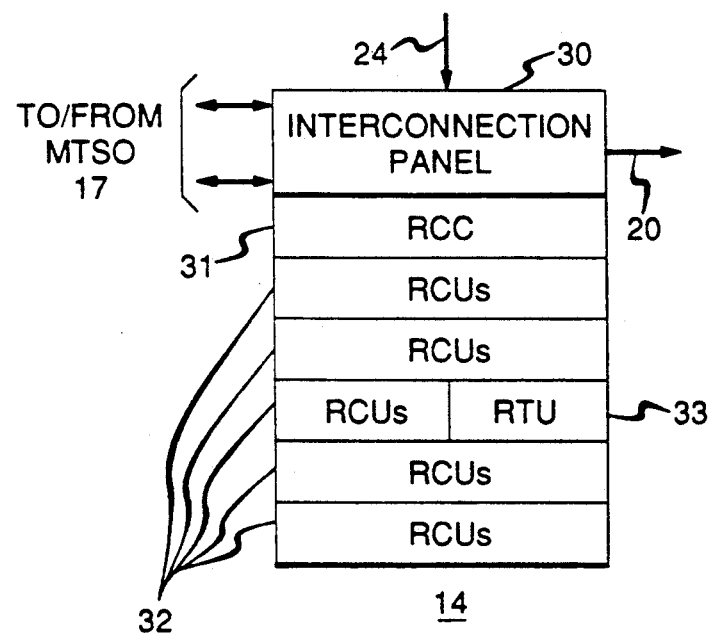
FIG. 2 shows an illustrative schematic configuration of various components of the primary radio channel frame 14 of FIG. 1.

In accordance with an illustrative embodiment of the invention, the primary radio channel frame 14, shown in FIG. 2, includes an interconnection panel 30, a radio control complex 31, a plurality of radio channel units 32 arranged in several shelves within the frame, with each shelf comprising associated power supplies, power combiners/dividers, switches, and digital signaling format, e.g., DS1, interfaces. Also included in the radio channel frame 14 is a radio test unit 33 used primarily to check the performance of the total RF path to and from the receive and transmit antennas 23 and 22.

Figure 3:
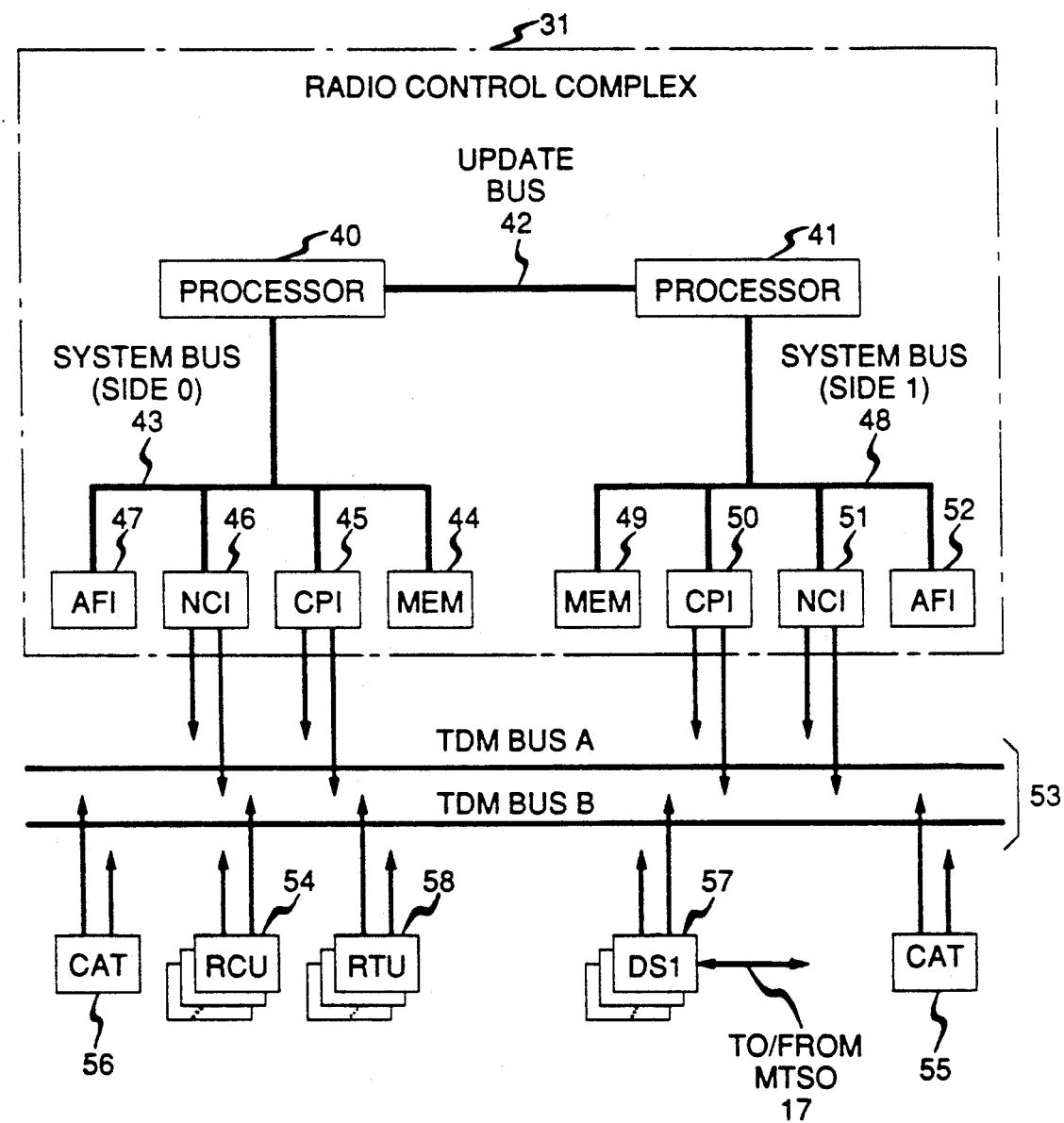
FIG. 3 is a functional block diagram representation of the primary radio channel frame shown in FIG. 2.

Referring now to FIG. 3 which shows an overall functional block diagram of the primary radio channel frame 14, the radio control complex 31 is illustratively shown as having two interconnected identical sides, referred to as side 0 and side 1. However, as it will become clear from the following description, only one side is necessary for the operation of the radio control complex 31. Clearly, a duplex configuration of the radio control complex 31 substantially enhances reliability of the cell site through duplication, in that while one side is active, its mating side is kept in a dormant state but ready to take control with a minimum loss of information in the event of failure of the active side. The radio control complex 31 includes two identical processors 40 and 41 interconnected by an update bus 42. Each processor provides the control processing function for the radio control complex 31. Normally, one processor, e.g., 40, is active and the other processor, i.e., 41, is in a standby mode. On side 0 of the radio control complex 31, the processor 40 is connected to a system bus 43 which in turn is coupled to a memory circuit 44, a communication processor interface circuit 45, at least one network control interface 46, and an alarm interface 47. Similarly, on the side 1 of the radio control complex 31, the processor 41 is connected to a system bus 48 which in turn is coupled to a memory circuit 49, a communication processor interface circuit 50, at least one network control interface 51 and an alarm interface 52.

The update bus 42 lets the active, call processing, processor, e.g., 40, keep its mate's memory 49 updated to allow the processors to switch roles, i.e., responsibility for call processing, without losing valuable information. Also, the update bus 42 allows the active processor, e.g., 40, to perform diagnostics on the mate processor, i.e., processor 41. Alternatively, if processor 41 is the active one, then the update bus 42 allows the updating of memory 44 so that processor 40 can take over the control of the call processing in case of failure of processor 41.

In accordance with an illustrative embodiment of the invention, the primary radio control frame 14 further includes at least one time division multiplexed bus 53 adapted to selectively connect, under control of either processors 40 or 41, a corresponding side of the radio control complex 31 to additional circuits within the frame 14. Such additional circuits include several radio channel units, of which only one is shown as RCU 54, clock and tone circuits 55 and 56, several digital facility interface circuits of which only one is shown in FIG. 3 as DS1 57, and at least one radio test unit 58. In accordance with a preferred embodiment, the processors 40 and 41 include known commercially available processing units, such as MC68020 microprocessors and support logic including timers, registers, memory (read only memory and random access memory) and update bus control circuitry. The memory circuits 44 and 49 may each, for example, contain a 36 bit one megabit DRAM of known type with associated control, refresh, timing and write protect logic necessary to access it. The communication processor interface circuits 45 and 50 are adapted to provide reliable control channels with the MTSO 17 through the time division multiplexed bus 53 and the digital interface facility 57. Synchronization of control channel messages between the processors 40 and 41 and the time division multiplexed bus 53 is provided by the network control interface circuits 46 and 51 respectively associated with side 0 and side 1 of the radio control complex 31.

As shown in FIG. 3, the time division multiplexed bus 53 preferably employs a pair of buses designated "A" and "B" to connect all the radio channel units, such as RCU 54, within the primary radio channel frame 14 and selected radio channel units in any optional growth radio channel frames, e.g., 15 or 16, in the event that such growth frames are used. In such case, an additional time division multiplexed bus is needed to interconnect the additional RCUs in the growth frames. All external interfaces, i.e., voice trunks 19 and data links 18 to and from MTSO 17, are connected to the time division multiplexed bus 53 via digital facility interfaces such as interface 57. All data links 18 from the MTSO 17 are connected to the bus 53 in the primary frame even through additional growth radio channel frames, such as 15 and 16, may be utilized. In accordance with a preferred embodiment, the bus 53 comprises a pair of 8-bit time division multiplexed buses "A" and "B" to permit voice, data, and control connectivity to any circuit connected to the bus 53. Illustratively, each bus "A" and "B" may support 256 time slots and operates at a clock frequency of 2.048 MHz. Separating the bandwidth into two physically separate buses "A" and "B" has two advantages. First, it cuts in half the frequency at which a single 512 time slot bus must operate at, and second it provides increased system reliability. If one bus fails, the system can still operate at reduced capacity on the remaining bus. Synchronization of bus control channel messages between either processor 40 or 41 and any circuit pack is performed by the associated network control interface 46 or 41, respectively. The messages transmitted over a control channel may comprise the first five time slots of either TDM bus "A" or "B". Only one bus can carry control information at any one time, and in the event of failure, control information is carried on the other bus. The control channel operates in a master/slave configuration with the network control interface 46 or 51 as master and the circuits 54 through 58 as slaves. Each such circuit must have a unique address and can only communicate with the network control interface when granted permission. This protocol prevents collisions on the TDM bus 53, where two circuits might otherwise try to transmit simultaneously.

In accordance with a preferred embodiment, the radio channel unit 54 shown in FIG. 3 is preferably a plug-in module containing all RF, baseband and control circuitry required to perform setup, locate or voice channel functions. The radio channel unit function as well as its operating channel, transmit power level, and other specific parameters are downloaded to each radio at initialization via the time division multiplexed bus 53 under control of the active processor 40 or 41. In addition, radio channel unit call processing algorithms are contained in nonvolatile memory circuits within each unit and may be updated via the time division multiplexed bus 53, if necessary. The down loadable parameter and nonvolatile memory update features advantageously allow remote reconfiguration of the radio channel unit and eliminate the need for many on-site visits. Also, the radio channel unit 54 contains built-in self test capabilities which are automatically executed at initialization and test results are reported to the radio control complex 31.

The radio test unit 58 is used, primarily, to check the performance of the total RF path to and from receive and transmit antennas 23 and 22 (shown in FIG. 1). The basic circuit of the radio test unit 58 is similar to that of a radio channel unit 54, with a few differences. The radio channel units 54 have two inputs, one for each diversity; the radio test unit 58 has only one. Another difference is in the RF switch control interfaces. On each radio channel unit shelf (32 in FIG. 2), the RF antenna selector switches associated with a channel unit are controlled via six parallel bit lines. Three bits are for the switches in the two receiver input diversity paths to each channel unit. The other three bits are for the switch in the transmit path. The radio test unit 58 controls RF switches located in the antenna interface frame 13. The radio test unit 58 contains a test receiver and test generator which serve to simulate a cellular/mobile subscriber unit. The test receiver can be tuned to any receive channel, and the test generator can be tuned to any transmit channel. Tuning is accomplished by commands sent by the time division multiplexed bus 53 to a transmit/receive frequency synthesizer (not shown) within the radio test unit 58. During receive testing on a cell site radio channel unit 54, the test generator within the radio test unit 58 is tuned to the channel under test, and the output of the test generator is applied to the appropriate cell site receiving antenna 23. Control is applied to the antenna interface frame 13 to select omni receive or one face of the directional antenna.

In accordance with a preferred embodiment, all the data and voice communications between the MTSO 17 and the cell site 10 are based on a digital signaling format DS1 which is a bipolar return-to-zero signal at a 1.544 Mb/s rate for T1-carrier. Alternatively, other digital signal formats may be used. The cell site data communication links 18 are selected, under the control of the communication processor interface 45 or 50, to operate at 9.6 kb/s, 56 kb/s or 64 kb/s rates. A DS1 carrier link can accommodate 24 digital voice communication channels or a combination of digital voice and data channels. For each DS1 carrier, the radio channel frames 14, 15 and 16 must each have at least one DS1 interface circuit 57. Two data links are required between the primary radio channel frame 14 and the MTSO 17 for reliability. This is best accommodated via two DS1 carriers, with one data channel in each link. All cell site interfaces are digital, using DS1 boards with DS1 interface circuits. When the facility is a T1-carrier, the DS1 interface allows connection directly to the radio control units without the need for D4 channel banks. If analog facilities are used, D4 channel banks would, however, be required. The DS1 interface also allows connection directly to microwave systems or to fiber optic systems such as, for example, AT&T's fiber optics multiplexer DDM-1000.

Although the present invention has been described in connection with particular embodiments thereof, additional embodiments, modifications and applications which will be apparent to those skilled in the art are included within the spirit and scope of the invention.

I claim:

1. A radio channel frame for cellular telecommunications systems comprising:
    a control processing unit;
    system bus means coupled to said control processing unit;
    a memory circuit, a network control interface circuit and a communications processor interface circuit each connected to said system bus means so that said control processing unit is capable of accessing each of said circuits;
    a plurality of radio channel units, each capable of performing setup, locate and voice channel functions;
    a plurality of digital interface circuits for interconnecting the radio channel frame to incoming and outgoing voice and data frame links; and
    multiplexing means adapted for selectively coupling under the control of said control processing unit any one of said plurality of radio channel units to any one of said plurality of digital interface circuits.

2. A radio channel frame according to claim 1, wherein the multiplexing means include a time division multiplexed bus for achieving voice, data and control connectivity to any of said interface circuits and said radio channel units.

3. A radio channel frame according to claim 2, wherein the time division multiplexed bus includes a pair of buses thereby increasing reliability at half the operating frequency.

4. A radio channel frame according to claim 3, wherein said network control interface circuit synchronizes control channel messages on either of the time division multiplexed buses between said control processing unit and any selected radio channel unit to be connected.

5. A radio channel frame for cellular telecommunications systems comprising:
    first and second control processing units adapted to be interconnected by an update bus means;
    first and second system bus means respectively coupled to said first and second control processing units;
    first and second memory circuits respectively connected to said first and said second system bus means so that each control processing unit is capable of accessing said first and second memory circuits;
    first and second network control interface means respectively connected to said first and second system bus means;
    first and second communications processor interface means respectively connected to said first and second system bus means;
    a plurality of radio channel units each capable of performing setup, locate or voice channel functions;
    a plurality of digital interface circuit means for interconnecting the radio channel frame to incoming and outgoing voice and data frame links; and time division multiplexed bus means adapted for selectively coupling, under the control of either one of said control processing units, any one of said plurality of radio channel units to any one of said plurality of digital interface circuit means.

6. A radio channel frame according to claim 5, wherein the time division multiplexing bus means include a pair of buses for achieving voice, data and control connectivity to any of said interface means and said radio channel units at increased reliability and reduced operating frequency.

7. A radio channel frame according to claim 6, wherein said network control interface means synchronize control channel messages on either bus of said pair of buses between said control processing units and any radio channel unit which is selected to be connected.

* * * * *